(12) United States Patent
Qiu

(10) Patent No.: US 11,614,174 B1
(45) Date of Patent: Mar. 28, 2023

(54) FLUID CHANNEL STRUCTURE, VALVE CORE ASSEMBLY AND TAP

(71) Applicant: Chunhe Qiu, Wenzhou (CN)

(72) Inventor: Chunhe Qiu, Wenzhou (CN)

( * ) Notice: Subject to any disclaimer, the term of this patent is extended or adjusted under 35 U.S.C. 154(b) by 0 days.

(21) Appl. No.: 17/585,472

(22) Filed: Jan. 26, 2022

Related U.S. Application Data

(63) Continuation-in-part of application No. 17/567,178, filed on Jan. 3, 2022.

(51) Int. Cl.
| | | |
|---|---|---|
| *F16K 11/078* | (2006.01) | |
| *F16K 27/04* | (2006.01) | |
| *G05D 23/13* | (2006.01) | |

(52) U.S. Cl.
CPC ........ *F16K 11/0787* (2013.01); *F16K 27/045* (2013.01); *G05D 23/13* (2013.01); *G05D 23/1313* (2013.01)

(58) Field of Classification Search
CPC ... F16K 11/0787; F16K 27/045; G05D 23/13; G05D 23/1313
See application file for complete search history.

(56) References Cited

U.S. PATENT DOCUMENTS

| | | | |
|---|---|---|---|
| 4,502,507 A | 3/1985 | Hayman | |
| 4,657,045 A | 4/1987 | Kitamura | |
| 4,676,270 A | 6/1987 | Knapp | |
| 4,941,506 A | 7/1990 | Bergmann | |
| 4,942,902 A | 7/1990 | Knapp | |
| 4,986,306 A | 1/1991 | Ferrari | |
| 5,224,509 A | 7/1993 | Tanaka et al. | |
| 5,303,736 A | 4/1994 | Orlandi | |
| 5,402,819 A * | 4/1995 | Bosio | F16K 11/0787 137/270 |
| 5,853,023 A * | 12/1998 | Orlandi | F16K 11/0787 137/271 |
| 6,009,893 A | 1/2000 | Chang | |
| 6,237,622 B1 * | 5/2001 | Cook | G05D 23/1313 137/454.6 |
| 6,321,786 B2 | 11/2001 | Schumacher | |
| 6,626,208 B2 * | 9/2003 | Chen | F16K 15/063 137/100 |

(Continued)

OTHER PUBLICATIONS

US Non Final OA issued in corresponding U.S. Appl. No. 17/143,256, mailed Feb. 25, 2021.

(Continued)

*Primary Examiner* — Craig M Schneider
*Assistant Examiner* — Christopher D Ballman

(57) ABSTRACT

The fluid channel structure includes a base and a connector. The base includes a first side surface defining at least three first openings, and a second side surface defining at least three second openings, each of the at least three first openings is communicated to one corresponding second opening to form a first inlet channel, a second inlet channel, and an outlet channel, inner surfaces of the first inlet channel, the second inlet channel, and the outlet channel are provided with threaded connecting elements. The at least three through holes are in one-to-one correspondence with the at least three first openings and communicated to corresponding second openings. The present disclosure further provides a valve core assembly and a tap.

20 Claims, 20 Drawing Sheets

(56) References Cited

U.S. PATENT DOCUMENTS

| | | | | |
|---|---|---|---|---|
| 6,805,151 | B1 * | 10/2004 | Chang | F16K 27/045 137/270 |
| 6,892,761 | B2 * | 5/2005 | Chen | F16K 11/0743 137/625.4 |
| 6,981,693 | B1 * | 1/2006 | Chang | F16K 31/605 251/368 |
| 7,069,941 | B2 | 7/2006 | Parsons et al. | |
| 7,108,012 | B2 * | 9/2006 | Rosko | F16K 11/0787 251/297 |
| 7,134,452 | B2 * | 11/2006 | Hiroshi | F16K 11/0787 251/117 |
| 7,156,363 | B2 | 1/2007 | Parsons et al. | |
| 7,174,916 | B2 * | 2/2007 | Chang | F16K 11/0743 137/637.3 |
| 7,185,676 | B2 * | 3/2007 | Huang | F16K 11/0787 137/636.3 |
| 7,357,154 | B1 * | 4/2008 | Chen | F16K 11/0787 251/297 |
| 7,389,793 | B2 * | 6/2008 | Wang | F16K 27/048 137/597 |
| 7,487,797 | B2 | 2/2009 | Di Nunzio | |
| 7,753,074 | B2 * | 7/2010 | Rosko | F16K 11/0787 251/285 |
| 7,845,574 | B2 | 12/2010 | Mace | |
| 7,896,025 | B2 * | 3/2011 | Hanson | E03C 1/04 137/454.6 |
| 7,926,508 | B2 | 4/2011 | Chen | |
| 8,109,293 | B2 | 2/2012 | Tucker | |
| 8,240,326 | B2 * | 8/2012 | Kacik | F16K 19/006 137/315.12 |
| 8,240,328 | B2 | 8/2012 | Kacik et al. | |
| 8,322,377 | B2 | 12/2012 | Di Nunzio | |
| 8,327,882 | B2 * | 12/2012 | Li | F16K 11/0787 137/625.4 |
| 8,375,974 | B2 * | 2/2013 | Yan | F16K 11/0743 251/118 |
| 8,453,669 | B2 * | 6/2013 | Veros | E03C 1/0403 4/677 |
| 8,490,653 | B2 * | 7/2013 | Chen | F16K 11/0787 137/625.4 |
| 8,496,025 | B2 | 7/2013 | Parsons et al. | |
| 8,640,726 | B2 * | 2/2014 | Tung | F16K 11/07 137/454.6 |
| 8,695,635 | B1 * | 4/2014 | Wang | F16K 11/0787 137/625.42 |
| 9,249,563 | B2 * | 2/2016 | Yasuhara | F16K 11/0787 |
| 9,267,612 | B2 | 2/2016 | Chen | |
| 9,441,750 | B2 * | 9/2016 | Huck | F16K 27/045 |
| 9,458,612 | B2 | 10/2016 | Thomas et al. | |
| 9,464,417 | B2 * | 10/2016 | Chen | F16K 11/056 |
| 9,611,945 | B2 * | 4/2017 | Kemp | F16K 31/605 |
| 9,644,353 | B1 * | 5/2017 | Chang | F16K 27/044 |
| 9,772,040 | B2 | 9/2017 | Liu et al. | |
| 9,931,606 | B2 | 4/2018 | Lange | |
| 10,119,253 | B2 * | 11/2018 | Seggio | E03C 1/0412 |
| 10,167,963 | B1 * | 1/2019 | Chang | F16K 27/045 |
| 10,167,964 | B1 * | 1/2019 | Chang | F16K 11/072 |
| 10,184,232 | B2 * | 1/2019 | Veros | E03C 1/0404 |
| 10,533,681 | B2 * | 1/2020 | Chen | F16K 19/006 |
| 10,571,034 | B2 * | 2/2020 | Kim | F16K 11/0743 |
| 10,754,363 | B2 * | 8/2020 | Fassolette | G05D 23/134 |
| 10,794,501 | B2 * | 10/2020 | Gili Martínez | F16K 11/0787 |
| 10,935,157 | B2 | 3/2021 | Du et al. | |
| 2002/0100510 | A1 * | 8/2002 | Otelli | F16K 27/045 137/625.17 |
| 2004/0084097 | A1 * | 5/2004 | Bloom | F16K 11/0787 137/625.17 |
| 2007/0044850 | A1 * | 3/2007 | Pieters | F16K 11/0787 137/597 |
| 2008/0230735 | A1 * | 9/2008 | Cheng | F16K 11/0787 251/359 |
| 2009/0205717 | A1 * | 8/2009 | Yuan | F16K 15/026 137/100 |
| 2012/0012213 | A1 * | 1/2012 | Tedoldi | F16K 11/0787 137/625.4 |
| 2012/0222763 | A1 | 9/2012 | Yang | |
| 2015/0144214 | A1 * | 5/2015 | Chang | F16K 11/0743 137/625.41 |
| 2016/0237662 | A1 * | 8/2016 | Chang | F16K 27/045 |
| 2017/0328042 | A1 * | 11/2017 | Tzeng | F16K 19/006 |
| 2018/0059693 | A1 * | 3/2018 | Rodriguez | E03C 1/0404 |
| 2019/0353259 | A1 * | 11/2019 | Cattaneo | F16K 11/0787 |
| 2020/0080652 | A1 * | 3/2020 | Ritter | F16K 11/072 |
| 2020/0132200 | A1 * | 4/2020 | Chang | F16K 39/045 |
| 2021/0017742 | A1 * | 1/2021 | Kobayashi | E03C 1/044 |

OTHER PUBLICATIONS

US Non Final OA issued in corresponding U.S. Appl. No. 17/225,114, mailed Jun. 8, 2021.

* cited by examiner

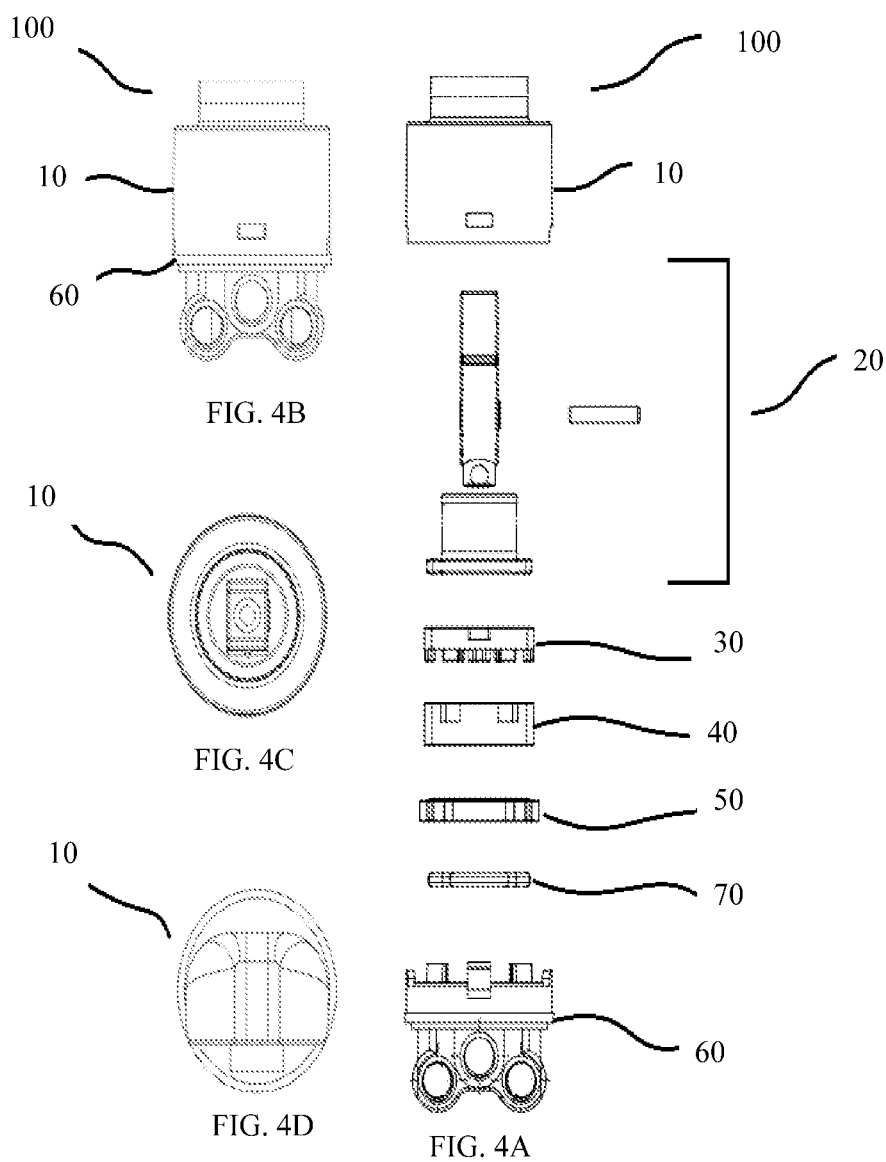

FLUID CHANNEL STRUCTURE, VALVE CORE ASSEMBLY AND TAP

CROSS-REFERENCE TO RELATED APPLICATIONS

This application is a continuation-in-part of U.S. patent application Ser. No. 17/567,178 filed on Jan. 3, 2022, which is a continuation-in-part of U.S. patent application Ser. No. 17/225,114 filed on Apr. 8, 2021, now U.S. Pat. No. 11,215,289, issued on Jan. 4, 2022.

FIELD OF THE DISCLOSURE

The present disclosure relates to taps, and, more particularly, to a fluid channel structure, a valve core assembly having the fluid channel structure, and a tap having the valve core assembly.

BACKGROUND OF THE DISCLOSURE

Valve cores in the taps are configured to regulate water flowing through taps. Generally, valve cores include complex structure of various moving and static elements coupled to each other. Further, the complexity of the overall valve cores increases when the valve cores are for outlet of mixed water supply that are adapted to the intake hot and cold water and mix thereto to output the mixed water. More often than not, during maintenance of such valve cores, disassembling and assembling of such complex valve cores are quite cumbersome and time consuming. Further, due to more parts than required, often, there are probable chance of losing or damaging of one or other parts of conventional valve cores causing leakage in the taps.

Accordingly, there exists a need to overcome shortcomings of the conventional valve cores. For example, there exists a need of a valve core which may be comparatively less in complexity in the overall structure of valve cores. Further, there is need of such valve core which may be simple in structure and involves less structural arrangements. Further, there is need of such valve core which may be easy to assemble and disassemble for maintenance purposes.

SUMMARY OF THE DISCLOSURE

In one aspect of the present disclosure, a fluid channel structure is provided. The fluid channel structure may include a base and a connector. The base includes a first side surface defining at least three first openings, and a second side surface defining at least three second openings, each of the at least three first openings is communicated to one corresponding second opening to form a first inlet channel, a second inlet channel, and an outlet channel, inner surfaces of the first inlet channel, the second inlet channel, and the outlet channel are provided with threaded connecting elements. The connector defines at least three through holes, the at least three through holes are in one-to-one correspondence with the at least three first openings and communicated to corresponding second openings.

In another aspect of the present disclosure, a valve core assembly is provided. The valve core assembly includes the fluid channel structure and a valve structure. The valve structure includes a valve housing member, an actuating member rotatably disposed in the valve housing member, a control plate disposed in the valve housing member and coupled to the actuating member, a moving plate member disposed in the valve housing member and coupled to the control plate, a static plate member disposed adjacent to the moving plate member in the valve housing member, a sealing member removably disposed between the static plate member and the connector of the base. The moving plate member is adaptable to be rotated or slid by the control plate upon an actuation by the actuating member. The static plate member has a first inlet cavity, a second inlet cavity and an outlet cavity. The sealing member has a complementary first inlet cavity, a complementary second inlet cavity and a complementary outlet cavity, the complementary first inlet cavity is communicated to the first inlet cavity and the first inlet channel and one corresponding through hole, the complementary second inlet cavity is communicated to the second inlet cavity and the second inlet channel and another one corresponding through hole, the complementary outlet cavity is communicated to the outlet cavity and the outlet channel and another one corresponding through hole.

In another aspect of the present disclosure, a tap is provided. The tap includes the valve core assembly and a hollow pipe, the valve core assembly is communicated to the hollow pipe.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which:

FIG. 4A illustrates an exploded view of the valve core assembly, in accordance with an exemplary embodiment of the present disclosure;

FIG. 4B illustrates a side assembled view of the valve core assembly, in accordance with an exemplary embodiment of the present disclosure;

FIG. 4C illustrates a bottom assembled view of the valve core assembly, in accordance with an exemplary embodiment of the present disclosure;

FIG. 4D illustrates a top assembled view of the valve core assembly, in accordance with an exemplary embodiment of the present disclosure;

Like reference numerals refer to like parts throughout the description of several views of the drawing.

DETAILED DESCRIPTION OF THE DISCLOSURE

Figure 1:
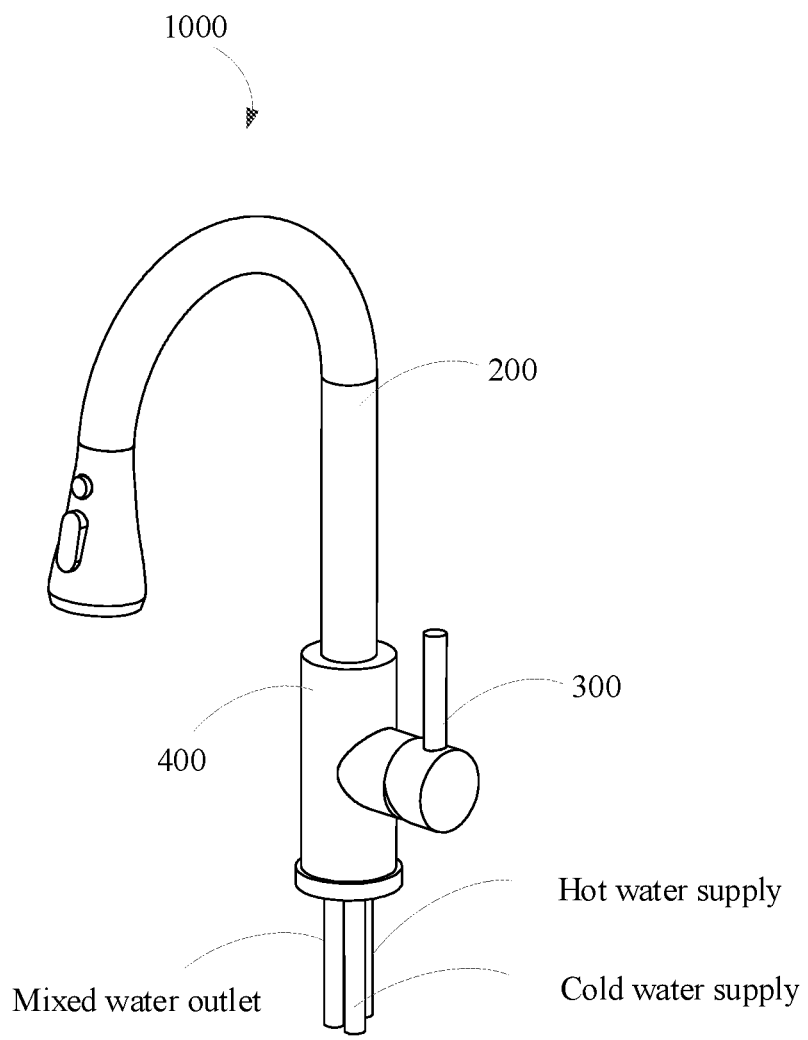
FIG. 1 illustrates a perspective view of a tap, in accordance with an exemplary embodiment of the present disclosure.

The exemplary embodiments described herein detail for illustrative purposes are subject to many variations in implementation. The present disclosure provides a valve core assembly. It should be emphasized, however, that the present disclosure is not limited only to what is disclosed and extends to cover various alternation to valve core assembly. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

A fluid channel structure 60 will now be described in conjunction with FIGS. 1 to 4, 10 to 13 and 16 to 22, in accordance with an exemplary embodiment of the present disclosure. The fluid channel structure 60 includes a base 61 and a connector 63 connected to the base 61. The base 61 includes a first side surface 610a defining at least three first openings 611 and a second side surface 610b defining at least three second openings 613. Each of the at least three first openings 611 is communicated to one corresponding second opening 613 to form a first inlet channel 615, a second inlet channel 616, and an outlet channel 617. Inner surfaces of the first inlet channel 615, the second inlet channel 616, and the outlet channel 617 are all provided with threaded connecting elements 618. The connector 63 defines at least three through holes 631, the at least three through holes 631 are in one-to-one correspondence with the at least three first openings 611 and communicated to corresponding second openings 613.

In one embodiment, the first inlet channel 615, the second inlet channel 616, and the outlet channel 617 are perpendicularly arranged. The outlet channel 617 is arranged between the first inlet channel 615 and the second inlet channel 616.

Figure 19A:
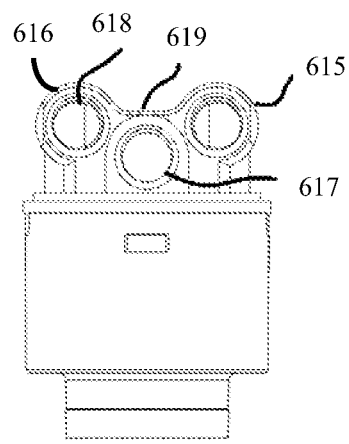
FIGS. 19A and 19B, respectively, illustrates configuration of channels as an one-piece structure and as a multi piece structure of the valve core assembly of FIGS. 4A to 4D, in accordance with an exemplary embodiment of the present disclosure.
Figure 19B:
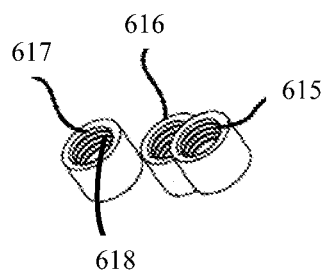

In one embodiment, as shown in FIG. 19A, the first inlet channel 615, the second inlet channel 616, and the outlet channel 617 are integrally formed as a one-piece structure. The one-piece structure may be injection molded. In another embodiment, as shown in FIG. 19B, the first inlet channel 615, the second inlet channel 616, and the outlet channel 617 are separately formed as a multi piece structure.

In one embodiment, the base 61 is integrated with the connector 63 as an one-piece structure. The base 61 and the connector 63 may be made of the same material or different materials, such as metal, or plastic. The one-piece structure may be injection molded.

Figure 10A:
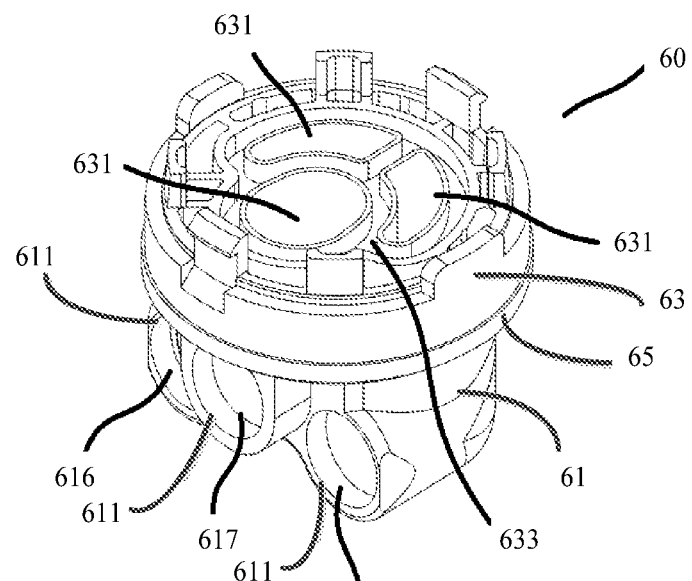
FIGS. 10A and 10B, respectively, illustrate a perspective view and a cross-sectional view of a fluid channel structure of the valve core assembly of FIGS. 4A to 4D, in accordance with an exemplary embodiment of the present disclosure.

In one embodiment, referring to FIG. 10A, a surface of the connector 63 away from the base 61 defines a receiving groove 633, the receiving groove 633 is configured to surround peripheries of the at least three through holes 631. The receiving groove 633 is configured to receive a sealing member 70.

In one embodiment, referring to FIGS. 10A, 10B, 20A, 22A and 22B, the base 61 and the connector 63 are formed separately, and the base 61 is fixedly connected to the connector 63 through a clamping structure. The clamping structure includes at least one clamping protrusion 635 arranged on a surface of the connector 63 facing the base 61, and at least one clamping hole 612 defined on a surface of the base 61 facing the connector 63, the at least one clamping protrusion 635 is clamped in the at least one clamping hole 612 to clamp the base 61 with the connector 63.

Figures 22A, 22B:
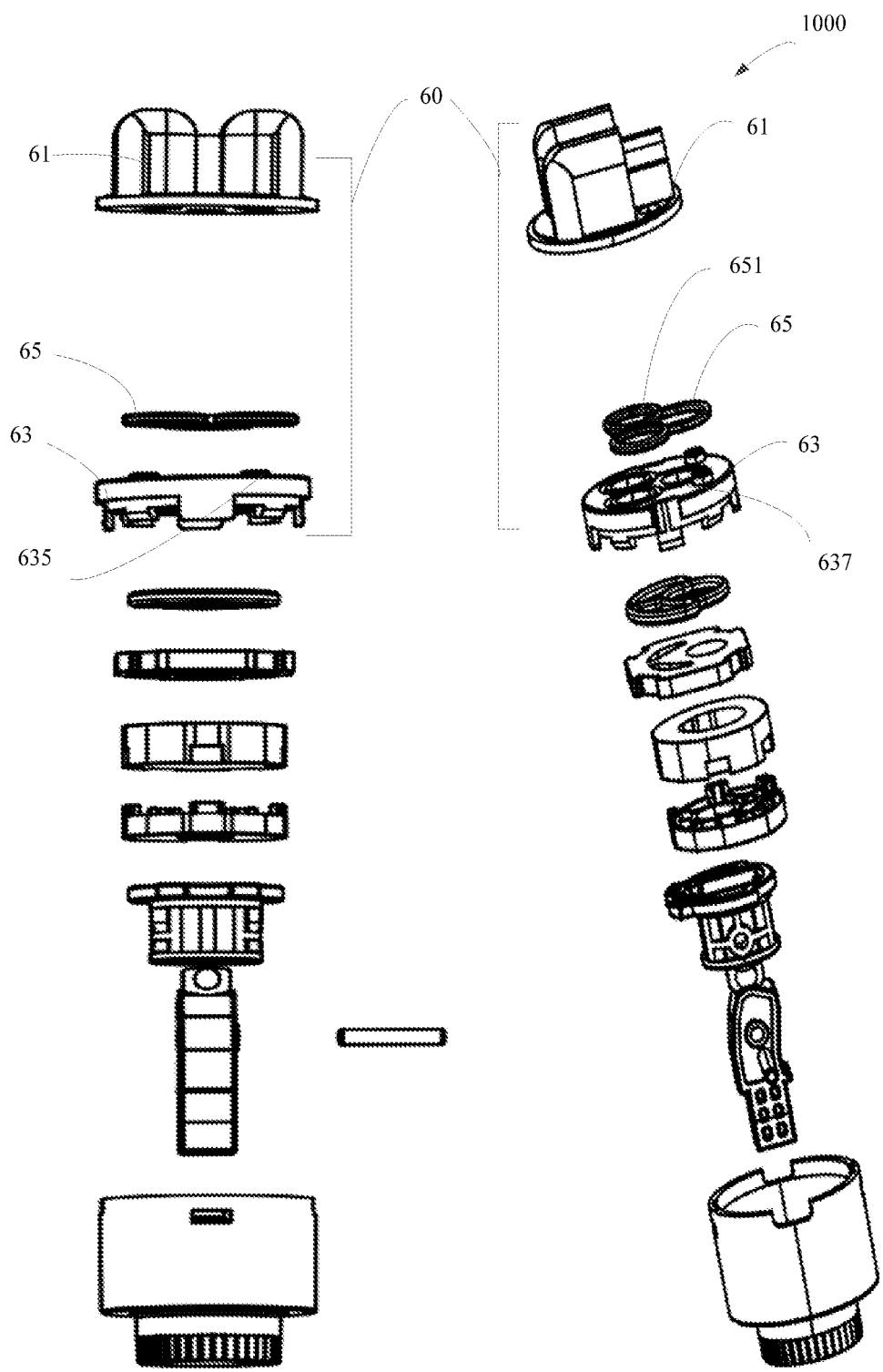
FIGS. 22A and 22B, respectively, illustrate side and perspective exploded views of the valve core assembly highlighting a three-part structure of the valve seat member.

In one embodiment, referring to FIGS. 10A and 22B, the fluid channel structure further is in a three-part structure and includes a sealing element 65 sandwiched between the base 61 and the connector 63. The sealing element 65 is configured for preventing a leakage between the base 61 and the connector 63. The surface of the connector 63 facing the base 61 defines an accommodating groove 637 configured for accommodating the sealing element 65, and the accommodating groove 637 is configured to surround peripheries of the at least three through holes 631 to guide a flow of water. The sealing element 65 defines at least three through-recesses 651 which are aligned with and communicated to the at least three first openings 611, the at least three second openings 613, and the at least three through holes 631.

In one embodiment, referring to FIG. 19A, the threaded connecting elements 618 are integrated with the base 61, and the threaded connecting elements 618 and the base 61 are made of the same material, such as metal or plastic.

Figure 20A:
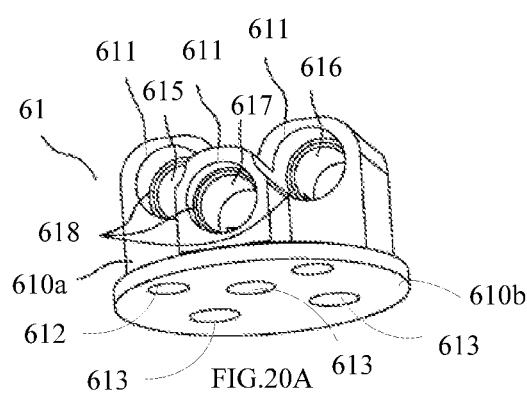
FIGS. 20A and 20B, respectively, illustrates front and back views of a base of the valve core assembly, in accordance with an exemplary embodiment of the present disclosure.

In one embodiment, referring to FIGS. 19B and 20A, the threaded connecting elements 618 and the base 61 are formed separately, and the threaded connecting elements 618 and the base 61 are made of different materials, such as metal or plastic. The threaded connecting elements 618 are arranged in the first inlet channel 615, the second inlet channel 616, and the outlet channel 617, respectively, and adjacent to the first openings 611.

Figure 18:
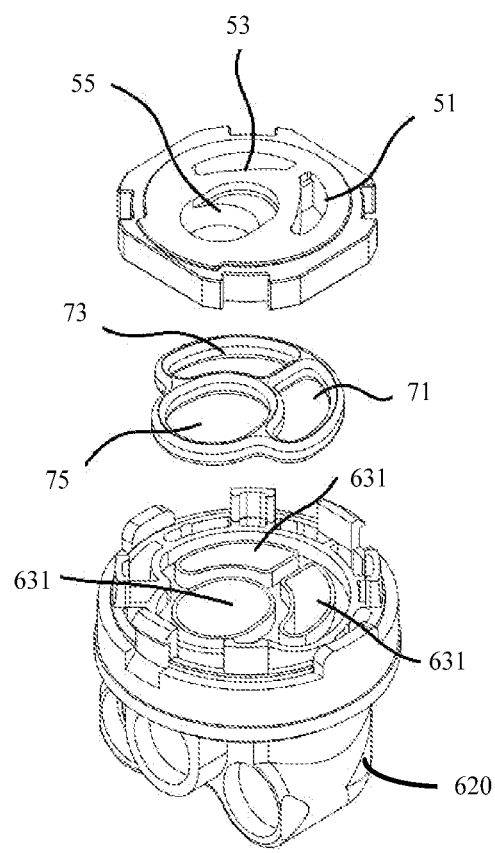
FIG. 18 illustrates collinearly aligned of cavities and channels of the valve core assembly of FIGS. 4A to 4D, in accordance with an exemplary embodiment of the present disclosure.

In one embodiment, referring to FIGS. 18 and 20A, the first inlet channel 615, the second inlet channel 616, and the outlet channel 617 all include a bending part 620, the bending parts 620 are arranged between the threaded connecting elements 618 and the second openings 613.

Figure 10B:
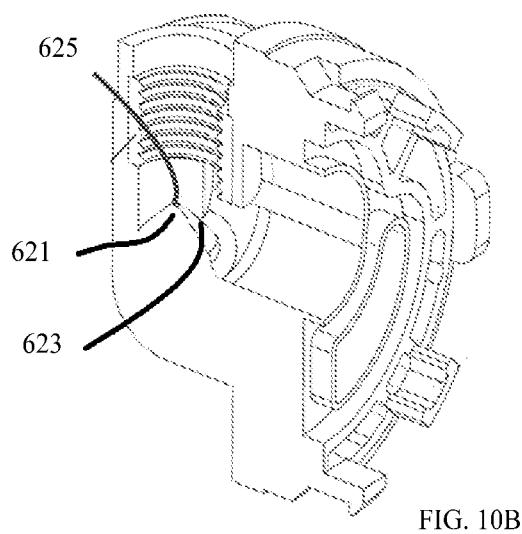
Figure 16:
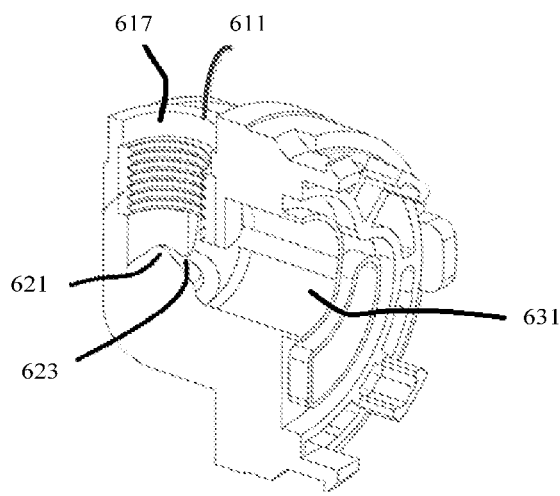
FIG. 16 illustrates configuration of one of the various openings with one of the various channels of the valve core assembly of FIGS. 4A to 4D, in accordance with an exemplary embodiment of the present disclosure.
Figure 17:
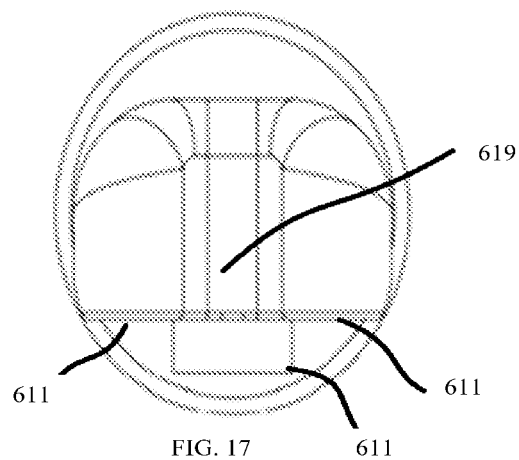
FIG. 17 illustrates a depression between a first inlet channel and a second inlet channel and respective opening of the valve core assembly of FIGS. 4A to 4D, in accordance with an exemplary embodiment of the present disclosure.

In one embodiment, referring to FIGS. 10B, 16 and 18, an inner side wall of each bending part 620 is provided with a guiding structure 621, the guiding structure is a groove or a protrusion. The flow guiding structure 621 are capable of guiding the flow of water in such a manner to reduce the noise of the flow water. In one example embodiment, the guiding structure 621 is tapered protrusion 623 taperedly extending from a respective circumference of the guiding structure 621, and pointing towards the first openings 611 such that a tip 625 of the tapered projection 623 terminates at an end of the first inlet channel 615, the second inlet channel 616, or the outlet channel 617, or at a last thread of the first inlet channel 615, the second inlet channel 616, or the outlet channel 617.

In one embodiment, referring to FIG. 10A, the first opening 611 corresponding to the outlet channel 617 is protruded from the other first openings 611. In one exemplary embodiment, the first opening 611 corresponding to the outlet channel 617 and the outlet channel 617 are protruded outwards from a plane of the first side face 610*a*, thereby forming a hill and valley pattern between the first inlet channel 615 and the second inlet channel 616.

Figure 20B:
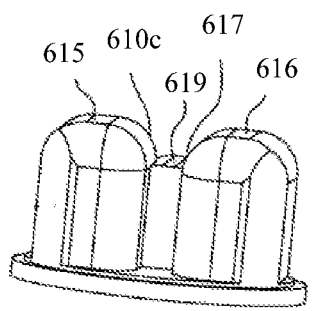

In one embodiment, the outlet channel 617 is arranged below in a level with respect to the first inlet channel 615 and the second inlet channel 616 (seen in FIG. 19A), thereby forming a depression 619 between the first inlet channel 615 and the second inlet channel 616 relative to a plane of a top face 610*c* of the base 61 (seen in FIG. 20B).

In one embodiment, referring to FIGS. 10A and 10B, the first opening 611 corresponding to the outlet channel 617 and the other first openings 611 are configured to face towards a same direction.

Figure 21A:
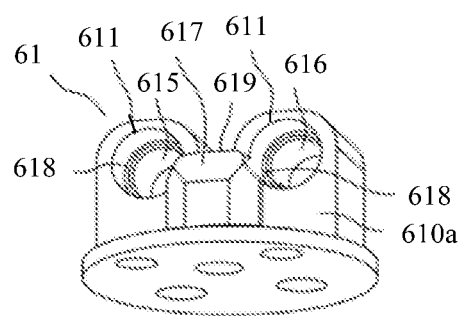
FIGS. 21A and 21B, respectively, illustrates front and back views of a base of the valve core assembly, in accordance with another exemplary embodiment of the present disclosure.
Figure 21B:
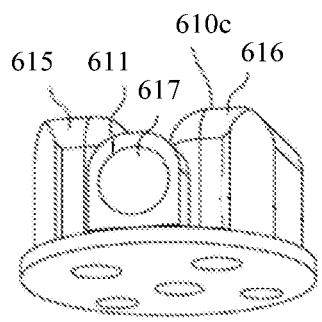

In one embodiment, referring to FIGS. 21A and 21B, the first opening 611 corresponding to the outlet channel 617 and the other first openings 611 are configured to face towards different directions.

A valve core assembly 100 having the fluid channel structure 60 will now be described in conjunction with FIGS. 1 to 22B, in accordance with an exemplary embodiment of the present disclosure. As seen in FIGS. 1 to 4, the valve core assembly 100 is provided. The valve core assembly 100 may be capable of being coupled horizontally or slantly to a hollow pipe 200. The valve core assembly 100 may include a handle assembly 300 coupled thereto to be actuated or rotated up-and-down or left-and-right to open and close the hollow pipe 200.

Referring now to FIGS. 4A to 4D, various views of the valve core assembly 100 are shown. Specifically, FIG. 4A illustrates an exploded view of the valve core assembly 100, in accordance with an exemplary embodiment of the present disclosure. FIG. 4B illustrates a side assembled view of the valve core assembly 100, in accordance with an exemplary embodiment of the present disclosure. FIG. 4C illustrates a bottom assembled view of the valve core assembly 100, in accordance with an exemplary embodiment of the present disclosure. FIG. 4D illustrates a top assembled view of the valve core assembly 100, in accordance with an exemplary embodiment of the present disclosure. As shown in FIG. 4A, the valve core assembly 100 further includes a valve structure 12 connected with the fluid channel structure 60 to open and close the fluid channel structure 60, the valve structure 12 includes a valve housing member 10, an actuating member 20, a control plate 30, a moving plate member 40, a static plate member 50, and a sealing member 70, the valve structure 12 and the fluid channel structure 60 are coupled to obtain the valve core assembly 100.

Figure 5A:
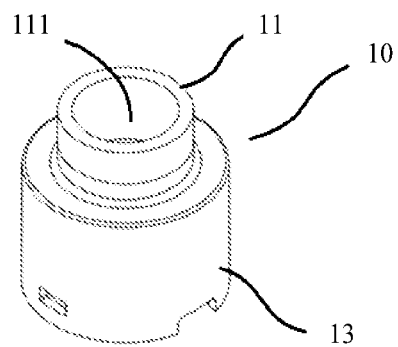
FIGS. 5A and 5B, respectively, illustrate perspective and cross-sectional views of a valve housing member of the valve core assembly of FIGS. 4A to 4D, in accordance with an exemplary embodiment of the present disclosure.
Figure 5B:
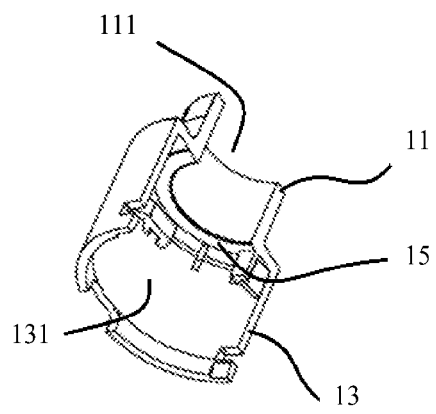

Referring now to FIGS. 5A and 5B, a perspective view and a cross sectional view of the valve housing member 10 are respectively illustrated in accordance with an exemplary embodiment of the present disclosure and will be described in conjunction with FIGS. 4A to 4D. As shown, the valve housing member 10 includes a first end portion 11, a second end portion 13, and a seat member 15 configured for separating the first end portion 11 from the second end portion 13. The valve housing member 10 defines a first cavity 111 and a second cavity 131, the first cavity 111 is defined in the first end portion 11 and the second cavity 131 is defined in the second end portion 13. In one embodiment, the second cavity 131 includes a bigger circumference area than the first cavity 111.

In one embodiment of the present disclosure, the fluid channel structure 60 may be detachably coupled to the valve housing member 10 by an attaching mechanism 80. The attaching mechanism 80 may include at least one fastening protrusion 81 and at least one fastening groove 83. The attaching mechanism 80 may further include at least one complementary extension 85 and at least one slot 87.

Figure 12:
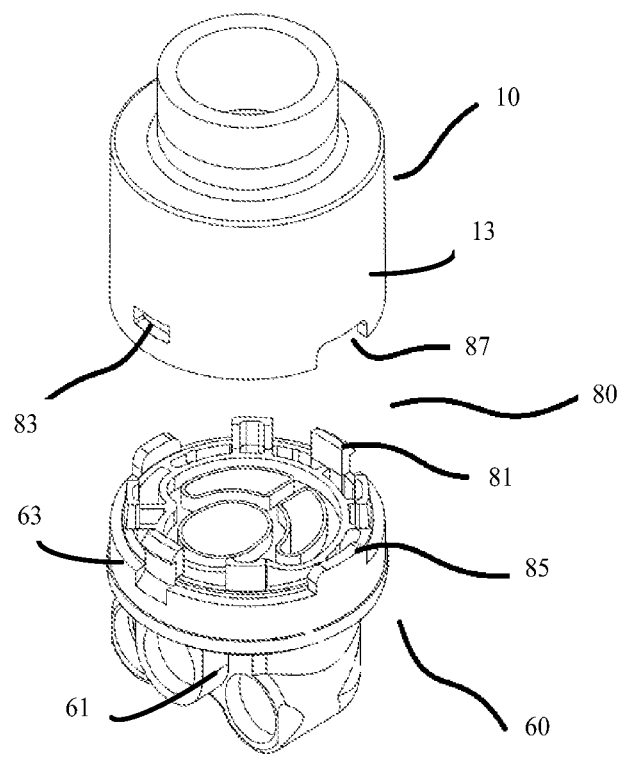
FIG. 12 illustrates an attaching mechanism 80 for coupling of the fluid channel structure and the valve core assembly of FIGS. 4A to 4D, in accordance with an exemplary embodiment of the present disclosure.
Figure 13:
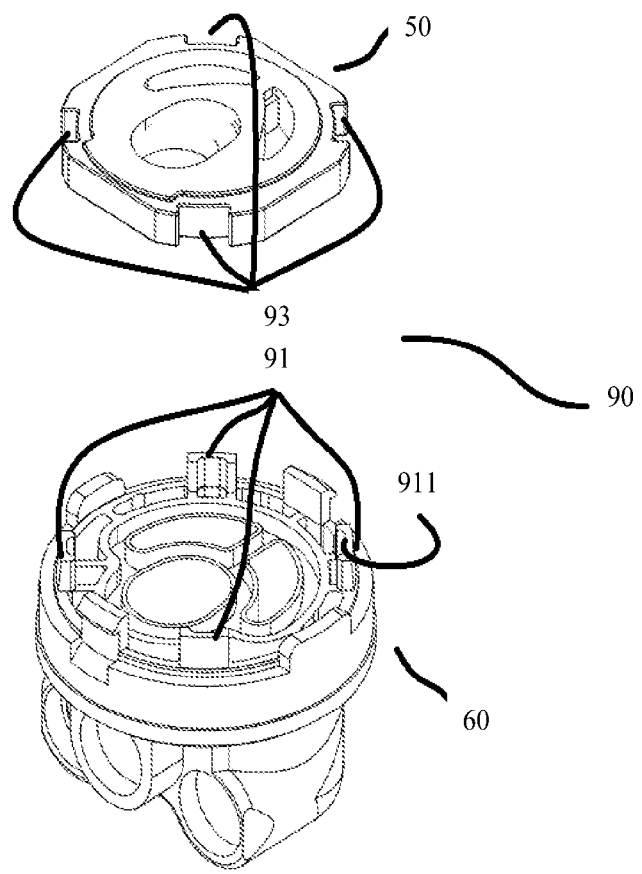
FIG. 13 illustrates an attachment arrangement for coupling the static plate member and the valve seat member of the fluid channel structure of FIGS. 4A to 4D, in accordance with an exemplary embodiment of the present disclosure.

In one embodiment, referring to FIG. 12, the surface of the connector 63 away from the base 61 includes at least one fastening protrusion 81, a side surface of the valve housing member 10 defines at least one fastening groove 83, the at least one fastening protrusion 81 is detachably received in the at least one fastening groove 83 to detachably connect the valve housing member 10 with the base 61 of the fluid channel structure 60. In one embodiment, a side surface of the second end portion 13 defines at least one fastening groove 83.

In one embodiment, referring to FIGS. 12, the at least one fastening protrusion 81 includes a plurality of fastening protrusions 81, the fastening protrusions 81 are arranged along a periphery of the surface of the connector 63 away from the base 61. Preferably, the fastening protrusions 81 may extend 180 degrees from an inner region of the periphery of the surface of the connector 63 away from the base 61.

In one embodiment, referring to FIG. 12, the at least one fastening groove 83 includes a plurality of fastening grooves 83, the fastening grooves 83 are defined along a periphery of the side surface of the valve housing member 10. In one embodiment, the side surface of the second end portion 13 defines the fastening grooves 83.

In one embodiment, referring to FIG. 12, the surface of the connector 63 away from the base 61 includes at least one complementary extension 85 spaced from the at least one fastening protrusion 81, the side surface of the valve housing member 10 defines at least one slot 87 spaced from the at least one fastening groove 83, the at least one complementary extension 85 is detachably received in the at least one slot 87 to detachably connect the valve housing member 10 with the base 61 of the fluid channel structure 60. In one embodiment, the side surface of the second end portion 13 defines at least one slot 87.

In one embodiment, referring to FIG. 12, the at least one complementary extension 85 includes a plurality of complementary extensions 85, the complementary extensions 85 are arranged along the periphery of the surface of the connector 63 away from the base 61.

In one embodiment, referring to FIG. 12, the at least one slot 87 includes a plurality of slots 87, the slots 87 defined along the periphery of the side surface of the valve housing member 10. In one embodiment, the side surface of the second end portion 13 defines the slots 87.

Figure 6A:
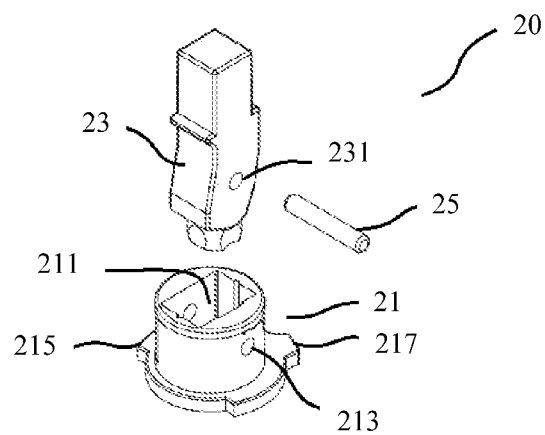
FIGS. 6A and 6B, respectively, illustrates a perspective exploded and a perspective assembled view of an actuating member of the valve core assembly of FIGS. 4A to 4D, in accordance with an exemplary embodiment of the present disclosure.
Figure 6B:
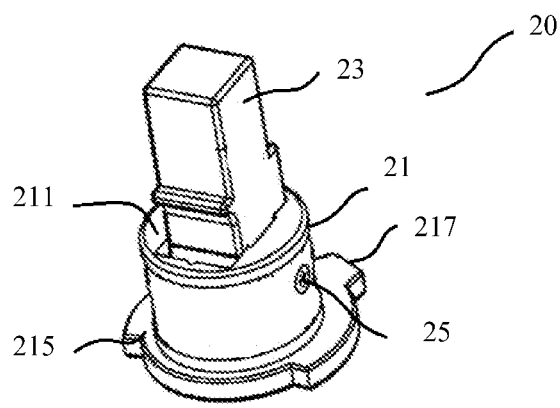

Referring now to FIGS. 6A and 6B, a perspective exploded and a perspective assembled view of the actuating member 20 are respectively illustrated in accordance with an exemplary embodiment of the present disclosure and will be described in conjunction with FIGS. 4A to 5B. The actuating member 20 may be rotatably disposed in the valve housing member 10. The actuating member 20 may include an actuator sleeve element 21, an actuator rod element 23, positioning holes 213, 231, and a protruding pin element 25. The actuator sleeve element 21 may include a sleeve cavity 211 and a sleeve flange 215. The actuator sleeve element 21 may be rotatably disposed in the first cavity 111, and the sleeve flange 215 rests on the seat member 15. Further, the actuator rod element 23 may be disposed in the sleeve cavity 211. The positioning holes 213, 231 may be defined along sides of the actuator sleeve element 21 and the actuator rod element 23. The positioning holes 213, 231 may be collinearly aligned when the actuator rod element 23 is disposed in the sleeve cavity 211. Further, the protruding pin element 25 may be engagingly disposed in the positioning holes 213, 231 to couple the actuator rod element 23 with the sleeve cavity 211.

Figure 7A:
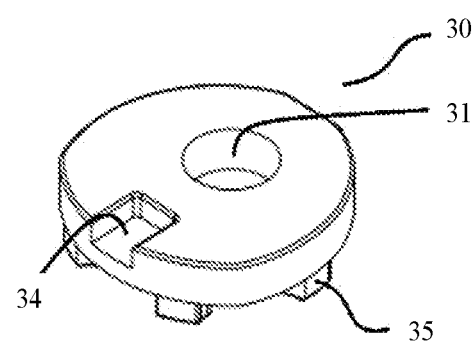
FIGS. 7A and 7B, respectively, illustrate perspective views from upside and downside of a control plate of the valve core assembly of FIGS. 4A to 4D, in accordance with an exemplary embodiment of the present disclosure.
Figure 7B:
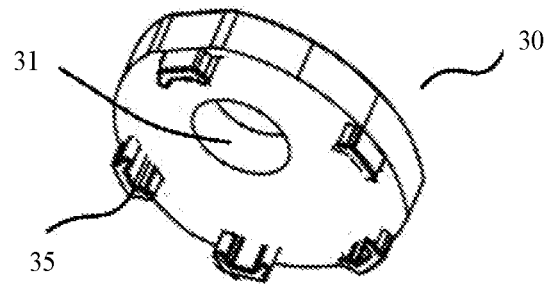

Referring now to FIGS. 7A and 7B, perspective views, of the control plate 30 that are respectively illustrated from upside and downside, in accordance with an exemplary embodiment of the present disclosure and will be described in conjunction with FIGS. 4A to 6B. The control plate 30 may be disposed in the second cavity 131 of the valve housing member 10 and coupled to the actuating member 20. The control plate 30 may include a rod cavity 31 configured on the control plate 30 to receive the actuator rod element 23 to be coupled the control plate 30 with the actuator rod element 23. The control plate 30 may include complementary extending members 35 formed along a circumferential region of the control plate 30. Further, the control plate 30 may also include a groove 34 configured thereon. The complementary extending members 35 and the control plate 30 may be described herein later.

Figure 8A:
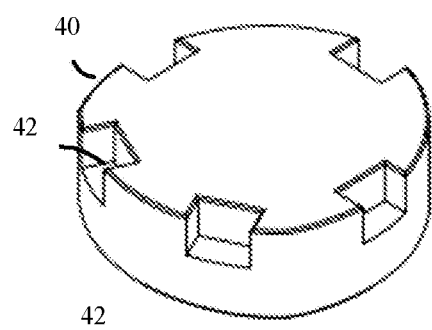
FIGS. 8A and 8B, respectively, illustrate perspective views from upside and downside of a moving plate member of the valve core assembly of FIGS. 4A to 4D, in accordance with an exemplary embodiment of the present disclosure.
Figure 8B:
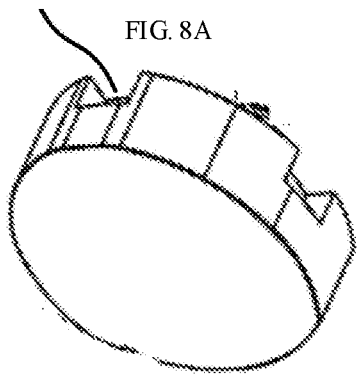

Referring now to FIGS. 8A and 8B, perspective views, of the moving plate member 40 that are respectively illustrated from upside and downside, in accordance with an exemplary embodiment of the present disclosure and will be described in conjunction with FIGS. 4A to 7B. The moving plate member 40 may be coupled to the control plate 30 and disposed in the second cavity 131 of the valve housing member 10. The moving plate 40 is adaptable to be rotated or slid by the control plate 30 upon an actuation by the actuating member 20.

Figure 9A:
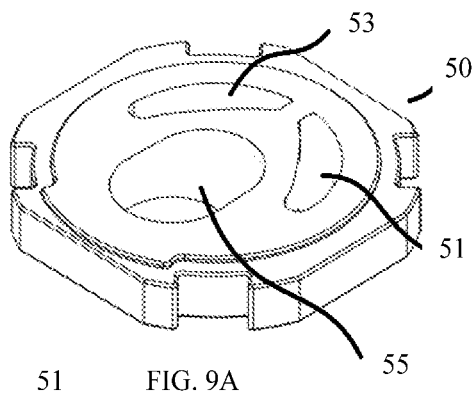
FIGS. 9A and 9B respectively illustrate perspective views from upside and downside of a static plate member of the valve core assembly of FIGS. 4A to 4D, in accordance with an exemplary embodiment of the present disclosure.
Figure 9B:
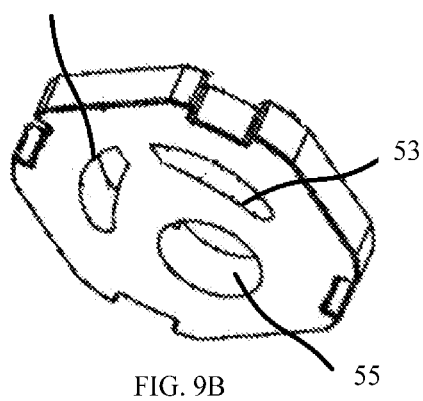

Referring now to FIGS. 9A and 9B, perspective views, of the static plate member 50 that are respectively illustrated from upside and downside, in accordance with an exemplary embodiment of the present disclosure and will be described in conjunction with FIGS. 4A to 8B. The static plate member 50 may be disposed adjacent to the moving plate member 40 in the second cavity 131 of the valve housing member 10. The static plate member 50 may include a first inlet cavity 51 communicated to the first inlet channel 515, a second inlet cavity 53 communicated to the second inlet channel 516, and an outlet cavity 55 communicated to the outlet channel 617.

Figure 11:
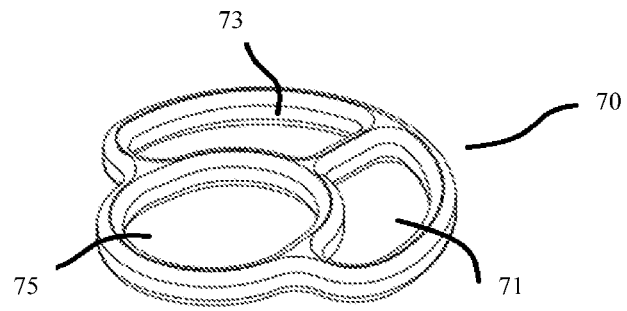
FIG. 11 illustrates a perspective view of the sealing member, in accordance with an exemplary embodiment of the present disclosure.

Referring now to FIG. 11, a perspective view of the sealing member 70 is illustrated in accordance with an exemplary embodiment of the present disclosure and will be described in conjunction with FIGS. 4A to 10B. The sealing member 70 may be removably disposed in the receiving groove 633 of the fluid channel structure 60. The sealing member 70 may include a complementary first inlet cavity 71, a complementary second inlet cavity 73 and a complementary outlet cavity 75 to fluidly align with respective the first inlet cavity 51, the second inlet cavity 53 and the mixed outlet cavity 55 upon being disposed in the receiving groove 633.

In one embodiment of the present disclosure, the static plate member 50 is detachably coupled to the fluid channel structure 60 such that when the fluid channel structure 60 is detachably coupled to the valve housing member 10, the static plate member 50 is positioned in the second cavity 131. The static plate member 50 is detachably coupled to the fluid channel structure 60 by an attachment arrangement 90, as shown and described with reference to FIG. 13 and will be described in conjunction to FIGS. 3 to 12. In one embodiment of the present disclosure, the attachment arrangement 90 may include an attaching protrusions 91 and a chamfered regions 93. The attaching protrusions 91 may extend 180 degrees from an outer region of a circumference of the connector 63 of the fluid channel structure 60. Each of the attaching protrusion 91 includes a hook-like member 911. Further, the chamfered regions 93 may be formed along an edge of the static plate member 50. The attaching protrusions 91 may be adapted to be received in the chamfered regions 93 and each respective hook-like member 911 grips a side wall of the chamfered regions 93 to detachably coupled the static plate member 50 with the fluid channel structure 60.

Figure 14:
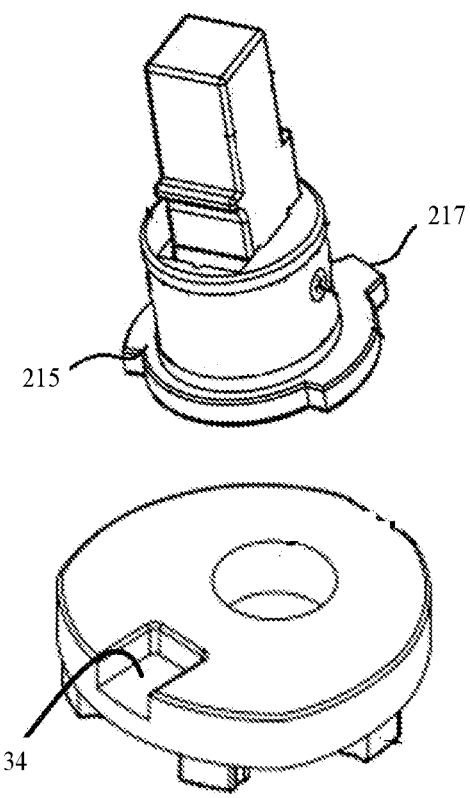
FIG. 14 illustrates a groove and protrusion combination for detachably coupling of the control plate and the actuating member of the valve core assembly of FIGS. 4A to 4D, in accordance with an exemplary embodiment of the present disclosure.

In one embodiment of the present disclosure, the control plate 30 and the actuating member 20 are detachably coupled to each other by a groove and protrusion combination, as shown in FIG. 14. In such an arrangement, the groove 34 may be formed on the control plate 30 and the protrusion 217 may be formed along the sleeve flange 215. The protrusion 217 of the sleeve flange 215 may engage with the groove 34 of the control plate 30 for detachably coupled to each other.

Figure 15:
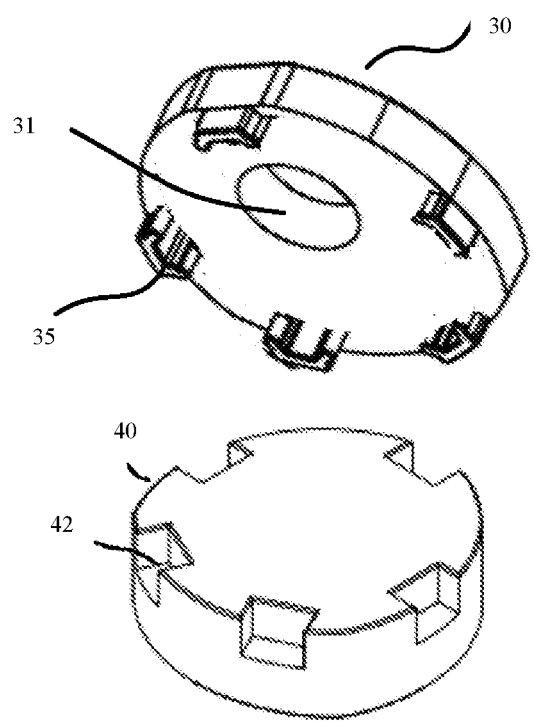
FIG. 15 illustrate a coupling between the moving plate member and the control plate of the valve core assembly of FIGS. 4A to 4D, in accordance with an exemplary embodiment of the present disclosure.

In one embodiment of the present disclosure, as shown in FIG. 15, the moving plate member 40 and the control plate 30 are coupled to each other. The moving plate member 40 may include recess members 42 formed along a circumferential region of the moving plate member 40. Further, the control plate 30 may include complementary extending members 35 extending 180 degrees from a circumferential region of the control plate 30. Such recess members 42 and the complementary extending members 35 are adapted to be detachably engageable to each other to detachably couple the moving plate member 40 and the control plate 30.

In one embodiment, as shown in FIG. 18, the second inlet cavity 53, the second inlet channel 616, and the complementary second inlet cavity 73 are collinearly aligned to each other. Further, the first inlet cavity 51, the first inlet channel 615, and complementary first outlet cavity 71 are collinearly aligned to each other. Furthermore, the outlet cavity 55, communicated to the out channel 617, and the complementary outlet cavity 75 are collinearly aligned to each other.

Referring now specifically to FIGS. 22A and 22B, and described in conjunction with FIGS. 1 to 21B, a valve core assembly 100 including: (i) a valve housing member 10 having, a first end portion 11 and a second end portion 13, a seat member 15 separating the first end portion 11 from the second end portion 13, a first cavity 111 defined in the first end portion 11, a second cavity 131 defined in the second end portion 13, and the second cavity 131 having a bigger circumference area than the first cavity 111; (ii) an actuating member 20 rotatably disposed in the valve housing member 10, the actuating member 20 having, an actuator sleeve element 21 having a sleeve cavity 211 and a sleeve flange 215, the actuator sleeve element 21 being rotatably disposed in the first cavity 111, and the sleeve flange 215 resting on the seat member 15, an actuator rod element 23 disposed in the sleeve cavity 211, positioning holes 213, 231 defined along sides of the actuator sleeve element 21 and the actuator rod element 23, and the positioning holes 213, 231 are collinearly aligned when the actuator rod element 23 is disposed in the sleeve cavity 211, a protruding pin element 25 engagingly disposed in the positioning holes 213, 231 to couple the actuator rod element 23 with the sleeve cavity 211; (iii) a control plate 30 disposed in the second cavity 131 of the valve housing member 10 and coupled to the actuating member 20, the control plate 30 having, a rod cavity 31 configured on the control plate 30 to receive the actuator rod element 23 to be coupled the control plate 30 with the actuator rod element 23; (iv) a moving plate member 40 coupled to the control plate 30 and disposed in the second cavity 131 of the valve housing member 10, and the moving plate 40 being adaptable to be rotated or slid by the control plate 30 upon actuation by the actuating member 20; (v) a static plate member 50 disposed adjacent to the moving plate member 40 in the second cavity 131 of the valve housing member 10, the static plate member 50 having a first inlet cavity 51, a second inlet cavity 53 and an outlet cavity 55; (vi) a fluid channel structure 60 detachably coupled to the valve housing member 10, the fluid channel structure 60 having, a first inlet channel 615 communicated to the first inlet cavity 51, a second inlet channel 616 communicated to the second inlet cavity 53, an outlet channel 617 communicated to the outlet cavity 55, a receiving groove 633 formed along sides of the at least three through holes 631 to guide the flow of water, the first inlet channel 615, the second inlet channel 616 and the outlet channel 617 being perpendicularly aligned and bend to fluidly coupled to the second openings 613, respectively, the first inlet channel 615, the second inlet channel 616 and the outlet channel 617 having threaded connecting elements 618 and guiding structures 621, the guiding structures 621 being formed along the respective bends of the first inlet channel 615, the second inlet channel 616 and the outlet channel 617, and each guiding structure 621 having a tapered protrusion 623 taperedly extending from a respective circumference of the guiding structures 621 and pointing towards the first openings 611 such that a tip 625 of the tapered projection 623 terminates at the end of the first inlet channel 615, the second inlet channel 616, or the outlet channel 617, or at a last thread of the first inlet channel 615, the second inlet channel 616, or the outlet channel 617; (vii) a sealing member 70 removably disposed in the receiving groove 633 of the fluid channel structure 60, the sealing member 70 having a complementary first inlet cavity 71, a complementary second inlet cavity 73 and a complementary outlet cavity 75 to fluidly align with respective the first inlet cavity 51, the second inlet cavity 53 and the outlet cavity 55 upon being disposed in the receiving groove 633, and the valve core assembly 100 additionally includes to have the fluid channel structure 60 to define a first side face 610a and a second side face 610b, and a top face 610c, and all the first openings 611 lying on same side on the first side face 610a.

The present disclosure is advantageous in providing a valve core, such as the valve core assembly 100, which may be comparatively less in complexity in the overall structure of valve cores. Further, the valve core assembly 100 may be simple in structure and involves less structural arrangements. Further, the valve core assembly 100 may be easy to assemble and disassemble for maintenance purposes.

A tap 1000 will now be described in conjunction with FIGS. 1 to 3. The tap 1000 includes the valve core assembly 100, the hollow pipe 200 communicated to the valve core assembly 100, a handle assembly 300 connected to the valve core assembly 100, and a protective housing 400 for receiving the valve core assembly 100. The valve core assembly 100 may be capable of being coupled horizontally or slantly to the hollow pipe 200, the handle assembly 300 may be actuated or rotated up-and-down or left-and-right to open and close the hollow pipe 200. In one embodiment, the valve core assembly 100 may be aligned downward such that the first openings 611 are aligned facing the ground. Two of the at least three first openings 611 may be coupled to hot-water supply and the cold-water supply. Further, another one first opening 611 may be directly coupled to an outlet of the hollow pipe 200. The cold and hot water get mixed within the valve core assembly 100 and the mixed water is outlet from the tap 1000 via the another one first opening 611 and the hollow pipe 200.

Figure 2:
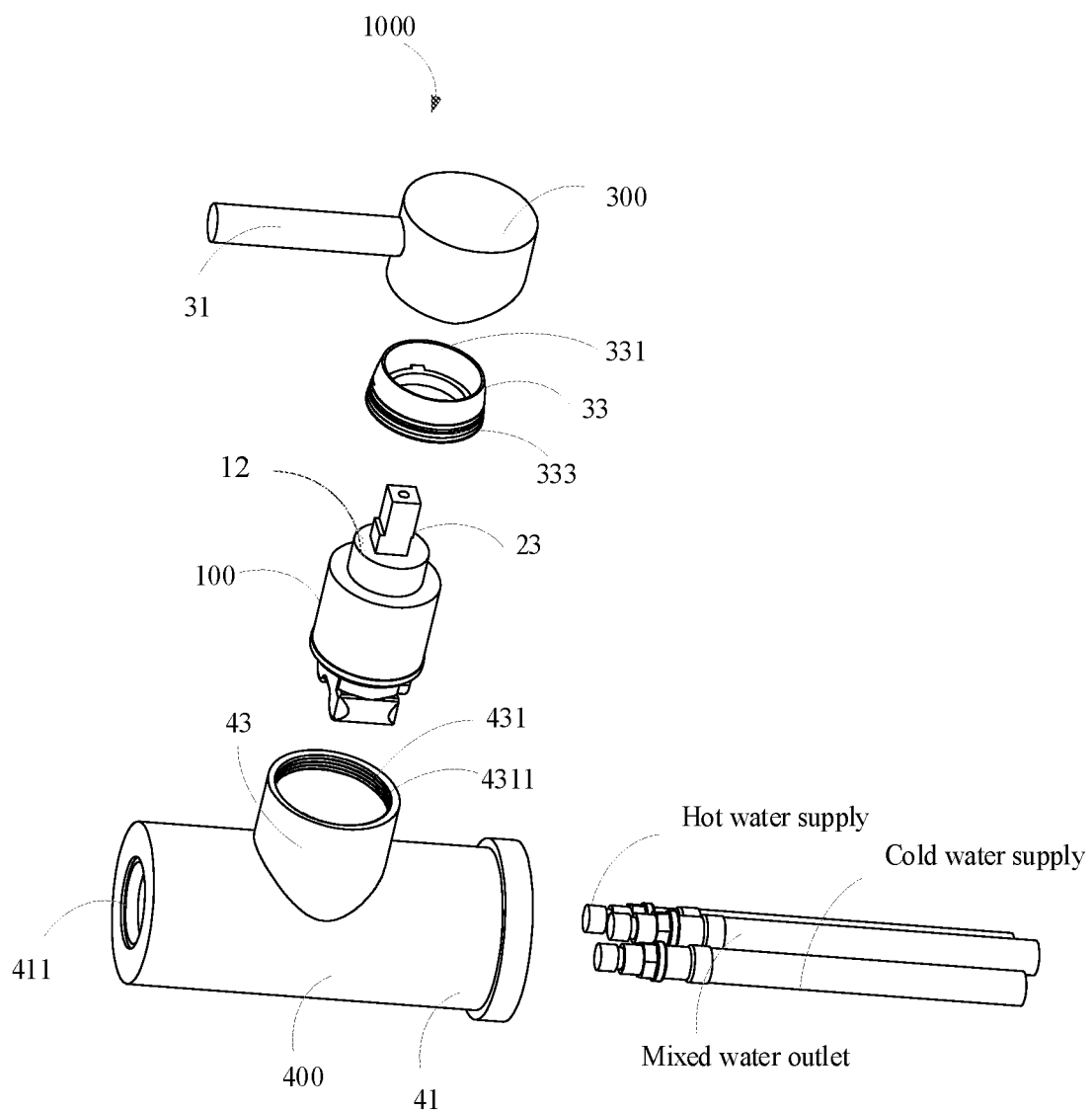
FIG. 2 illustrates an exploded view of some assemblies of the tap, in accordance with an exemplary embodiment of the present disclosure.
Figure 3:
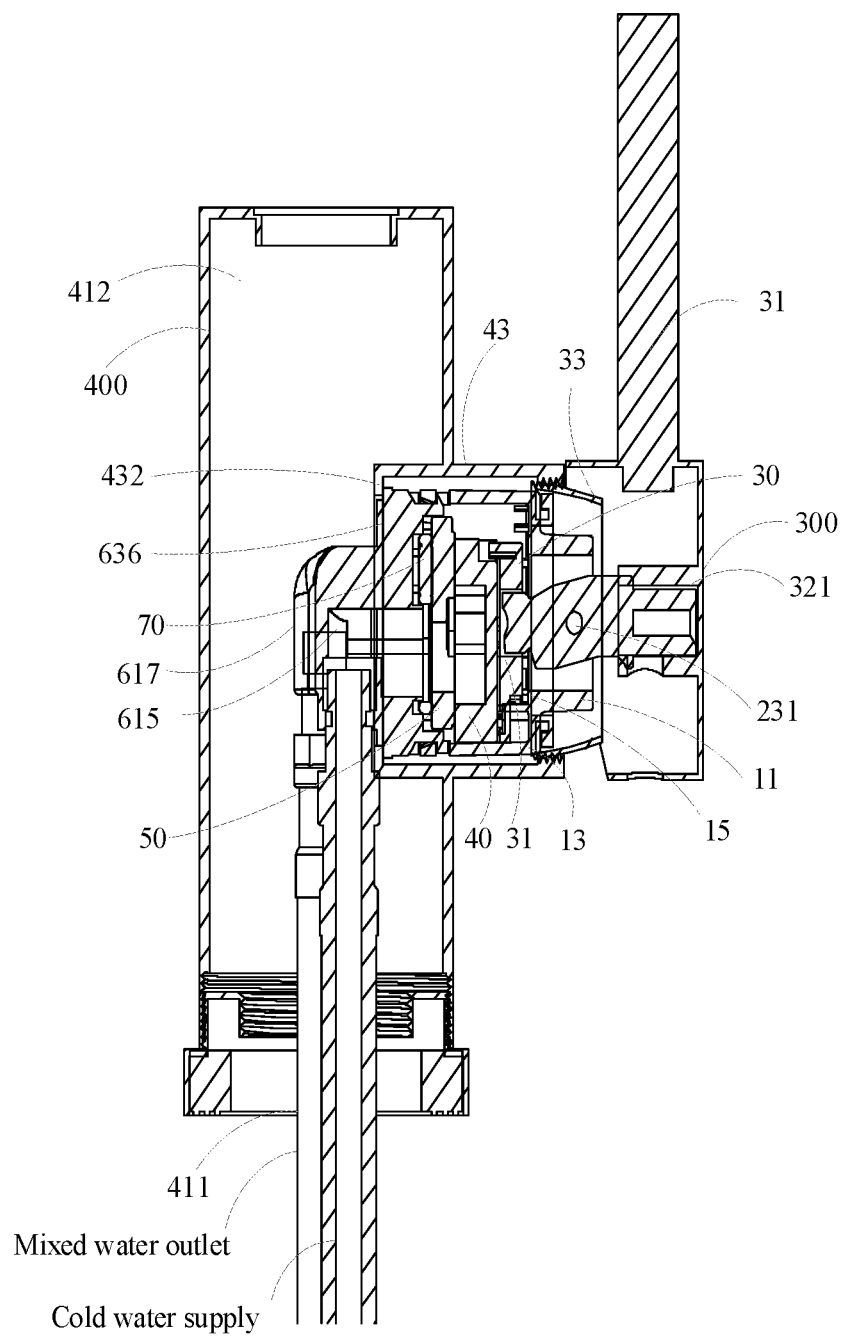
FIG. 3 illustrates a cross section view of some assemblies of the tap, in accordance with an exemplary embodiment of the present disclosure.

In one embodiment, referring to FIGS. 2 and 3, the handle assembly 300 includes a handle 31, a cover 32 connected to the handle 31, and a connecting component 33 partially arranged in the cover 32. The handle 31 is protruded from a side surface of the cover 31. The cover 32 has a receiving cavity (not labeled) configured for rotatably receiving a first end of the connecting component 33, and a fixing element 321 in the receiving cavity. The connecting component 33 has a through hole 331, the actuator rod element 23 is passed through the through hole 331 and fixed in the fixing element 321, to connect the handle assembly 300 with the actuating member 20 of the valve core assembly 100.

In one embodiment, referring to FIGS. 2 and 3, the protective housing 400 includes a protective body 41 and a connecting column 43 perpendicularly connected to the protective body 41. The protective body 41 has a through hole 411 and a first receiving cavity 412, the connecting column 43 defines a second receiving cavity 431 communicated to the through hole 411 and the first receiving cavity 412, the fluid channel structure 60 and the valve structure 12 are at least partially received in the receiving cavity 431. An end of the connecting component 33 away from the handle 31 is threadedly received in the receiving cavity 431 via the communication between the first receiving cavity 412 and the second receiving cavity 431. In detail, the connecting column 43 includes an internal thread 4311 facing an inner of the second receiving cavity 431, and the connecting component 33 includes an external thread 333, the connecting column 43 is threadedly connected with the connecting component 33. Hot water supply pipe, cold water supply pipe and mixed water outlet pipe are received in the through hole 411 and communicated to corresponding first openings 611. An end of the hollow pipe 200 is received in the through hole 411 and communicated to the outlet channel 617. The valve core assembly 100 is received in a space (not labeled) cooperatively formed by the handle assembly 300 and the protective housing 400. An end of the connecting column 43 adjacent to the handle assembly 300 has a bracket 432, and the bracket 432 is configured to support the fluid channel structure 60, another end of the connecting component 33 is threadedly connected with the connecting column 43, to mount the fluid channel structure 60 and the valve structure 12 in the second receiving cavity 431. In detail, a surface 636 of the connector 63 adjacent to the base 61 is supported by the bracket 432. The bracket 432 disposed in the connecting column 43 mounts the fluid channel 60 structure and the valve structure 12 in the second receiving cavity 431 of the connecting column 43 to communicate with the receiving cavity 431.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. A fluid channel structure, applied to a tap, the tap comprises a protective housing and a valve structure connected with the fluid channel structure, the protective housing comprises a first receiving cavity and a connecting column perpendicularly connected to the protective housing, the connecting column having a second receiving cavity in communication with the first receiving cavity, the fluid channel structure and the valve structure are at least partially received in the second receiving cavity via the communication, the fluid channel structure comprises:

(i) a base comprising
a first side surface defining at least three first openings; and
a second side surface, defining at least three second openings, each of the at least three first openings being communicated to one corresponding second opening to form a first inlet channel, a second inlet channel, and an outlet channel, inner surfaces of the first inlet channel, the second inlet channel; and the outlet channel being provided with threaded connecting elements; and
(ii) a connector defining at least three through holes, the at least three through holes being in one-to-one correspondence with the at least three first openings and being communicated to corresponding second openings, wherein a bracket disposed in the connecting column mounts the fluid channel structure and the valve structure in the second receiving cavity of the connecting column to communicate with the first receiving cavity.

2. The fluid channel structure of claim 1, wherein the base is integrated with the connector.

3. The fluid channel structure of claim 2, wherein a surface of the connector away from the base defines a receiving groove, the receiving groove is configured to surround peripheries of the at least three through holes.

4. The fluid channel structure of claim 1, wherein the base is fixedly connected to the connector through a clamping structure, the fluid channel structure further comprises a sealing element arranged between the base and the connector.

5. The fluid channel structure of claim 4, wherein a surface of the connector facing the base defines an accommodating groove configured for accommodating the sealing element, and the accommodating groove is configured to surround peripheries of the at least three through holes.

6. The fluid channel structure of claim 1, wherein the threaded connecting elements are integrated with the base.

7. The fluid channel structure of claim 1, wherein the threaded connecting elements and the base are formed separately, the threaded connecting elements are arranged in the first inlet channel, the second inlet channel, and the outlet channel, respectively, and adjacent to the first openings.

8. The fluid channel structure of claim 1, wherein the first inlet channel, the second inlet channel, and the outlet channel all comprises a bending part, the bending parts are arranged between the threaded connecting elements and the second openings.

9. The fluid channel structure of claim 8, wherein an inner side wall of each bending part is provided with a guiding structure, the guiding structure is a groove or a protrusion.

10. The fluid channel structure of claim 1, wherein the first opening corresponding to the outlet channel is protruded from the other first openings.

11. The fluid channel structure of claim 1, wherein one of the at least three first openings corresponding to the outlet channel and others of the at least three first openings are configured to face towards different directions.

12. A valve core assembly, comprising the fluid channel structure as recited in claim 1 and a valve structure, wherein, the valve structure comprises:

(i) a valve housing member;
(ii) an actuating member rotatably disposed in the valve housing member;
(iii) a control plate disposed in the valve housing member and coupled to the actuating member;

(iv) a moving plate member disposed in the valve housing member and coupled to the control plate, wherein the moving plate member is adaptable to be rotated or slid by the control plate upon an actuation by the actuating member;

(v) a static plate member disposed adjacent to the moving plate member in the valve housing member, the static plate member having a first inlet cavity, a second inlet cavity and an outlet cavity; and (vi) a sealing member removably disposed between the static plate member and the connector of the base, the sealing member having a complementary first inlet cavity, a complementary second inlet cavity and a complementary outlet cavity, the complementary first inlet cavity being communicated to the first inlet cavity and the first inlet channel and one corresponding through hole, the complementary second inlet cavity being communicated to the second inlet cavity and the second first inlet channel and another one corresponding through hole, the complementary outlet cavity being communicated to the outlet cavity and the outlet channel and another one corresponding through hole.

13. The valve core assembly of claim 12, wherein a surface of the connector away from the base comprises at least one fastening protrusion, a side surface of the valve housing member defines at least one fastening groove, the at least one fastening protrusion is detachably received in the at least one fastening groove to connect the valve housing member with the base of the fluid channel structure.

14. The valve core assembly of claim 13, wherein the at least one fastening protrusion comprises a plurality of fastening protrusions, the fastening protrusions are arranged along a periphery of the surface of the connector away from the base; or the at least one fastening groove comprises a plurality of complementary fastening grooves, the fastening grooves are defined along a periphery of the side surface of the valve housing member.

15. The valve core assembly of claim 13, wherein the surface of the connector away from the base comprises at least one complementary extension spaced from the at least one fastening protrusion, the side surface of the valve housing member defines at least one slot spaced from the at least one fastening groove, the at least one complementary extension is detachably received in the at least one slot to connect the valve housing member with the base of the fluid channel structure.

16. The valve core assembly of claim 15, wherein the at least one complementary extension comprises a plurality of complementary extensions, the complementary extensions are arranged along a periphery of the surface of the connector away from the base; or the at least one slot comprises a plurality of slots, the slots defined along a periphery of the side surface of the valve housing member.

17. The valve core assembly of claim 12, wherein a surface of the connector away from the base defines a receiving groove, the receiving groove is configured to surround peripheries of the at least three through holes and receive the sealing member.

18. The valve core assembly of claim 12, wherein the valve housing member comprises:

a first end portion defining a first cavity;

a second end portion defining a second cavity, the second cavity having a bigger circumference area than the first cavity, and the moving plate member and the static plate member being disposed in the second cavity of the valve housing member; and a seat member separating the first end portion from the second end portion.

19. The valve core assembly of claim 18, wherein the actuating member comprises:

an actuator sleeve element having a sleeve cavity and a sleeve flange, the actuator sleeve element being rotatably disposed in the first cavity, and the sleeve flange being configured to rest on the seat member; and an actuator rod element disposed in the sleeve cavity.

20. A tap, comprising the valve core assembly as recited in claim 12 and a hollow pipe, wherein the valve core assembly is communicated to the hollow pipe.

* * * * *